(12) United States Patent
Nagasawa (10) Patent No.: US 11,325,513 B2
(45) Date of Patent: May 10, 2022

(54) SEAT DEVICE FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/082,365

(22) Filed: Oct. 28, 2020

(65) Prior Publication Data

US 2021/0197698 A1 Jul. 1, 2021

(30) Foreign Application Priority Data

Dec. 27, 2019 (JP) .............................. JP2019-239814

(51) Int. Cl.
*B60N 2/64* (2006.01)
(52) U.S. Cl.
CPC .................................... *B60N 2/646* (2013.01)
(58) Field of Classification Search
CPC ..................................................... B60N 2/646
See application file for complete search history.

(56) References Cited

U.S. PATENT DOCUMENTS

| 9,161,630 B2 * | 10/2015 | Brncick | ................. | B60N 2/646 |
| 2012/0119551 A1 * | 5/2012 | Brncick | ................. | B60N 2/646 |
| | | | | 297/284.2 |
| 2018/0339620 A1 * | 11/2018 | Inoue | ..................... | B60N 2/646 |
| 2021/0197697 A1 | 7/2021 | Nagasawa | | |

FOREIGN PATENT DOCUMENTS

| JP | 2006-213103 A | 8/2006 | | |
| WO | WO-02057110 A1 * | 7/2002 | ............. | B60N 2/646 |

OTHER PUBLICATIONS

Office Action dated Oct. 14, 2021 in U.S. Appl. No. 17/082,340 (5 pages).

* cited by examiner

*Primary Examiner* — Anthony D Barfield
(74) *Attorney, Agent, or Firm* — Smith, Gambrell & Russell, LLP (57) ABSTRACT

A seat device for a vehicle includes a seat cushion, a slow deformation portion, and tilted standing members. An occupant in the vehicle is to be seated on the seat cushion. The deformation portion is disposed in at least a portion of the seat cushion and configured in such a manner that the deformation portion is deformed as a result of a load to be applied continuously to the deformation portion. The standing members stand in a load direction in an inner portion of the deformation portion and configured to be tilted as a result of the deformation of the deformation portion. When the outer and inner portions of the deformation portion are deformed by the load, the standing members in the outer and inner portions and the standing members in the inner portion are tilted respectively forward and rearward, from their respective positions before the load is applied.

20 Claims, 5 Drawing Sheets

LAPSE OF TIME

FIG. 5B

SEAT DEVICE FOR VEHICLE

CROSS-REFERENCE TO RELATED APPLICATIONS

The present application claims priority from Japanese Patent Application No. 2019-239814 filed on Dec. 27, 2019, the entire contents of which are hereby incorporated by reference.

BACKGROUND

The disclosure relates to a seat device for a vehicle.

A seat device is used in a vehicle (Japanese Unexamined Patent Application Publication No. 2006-213103).

SUMMARY

An aspect of the disclosure provides a seat device for a vehicle. The seat device includes a seat cushion, a slow deformation portion, and a plurality of tilted standing members. An occupant in a vehicle is to be seated on the seat cushion. The slow deformation portion is disposed in at least a portion of the seat cushion and is configured in such a manner that deformation thereof proceeds as a result of a load to be applied continuously to the slow deformation portion. The tilted standing members stand in a load direction in an inner portion of the slow deformation portion. The tilted standing members are configured to be tilted as a result of the deformation of the slow deformation portion by the load. When an outer portion of the slow deformation portion is deformed by the load, the tilted standing members that stand in the outer portion of the slow deformation portion are tilted forward from respective positions thereof at a time before the load is applied. When an inner portion of the slow deformation portion is deformed by the load, the tilted standing members that stand in the inner portion of the slow deformation portion are tilted rearward from respective position thereof at a time before the load is applied.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

A seat device for a vehicle has a correct seating location regarding a seat cushion. By sitting in the seating location, an occupant is suppressed from easily getting tired, even when sitting for a long time.

An occupant in a vehicle, however, does not always sit, in a correct seating location regarding a seat cushion, in a correct direction and a correct posture.

For example, an occupant gets into an automobile by opening a door of a cabin and sits on a seat device. In this case, the occupant tends to sit on the seat device with the waist and the lower limbs directed outward from the front. There is also a likelihood of an occupant driving or riding a vehicle with the lower limbs and the upper body being twisted from each other. When not feeling discomfort relating to the twist between the lower limbs and the upper body, the occupant continues to be in the vehicle that travels without correcting the twisted posture. As a result, the occupant may feel great discomfort caused by the twist, for example, after being in the vehicle for a long time.

Thus, an improvement of seat devices for vehicles is desirable.

Figure 1A:
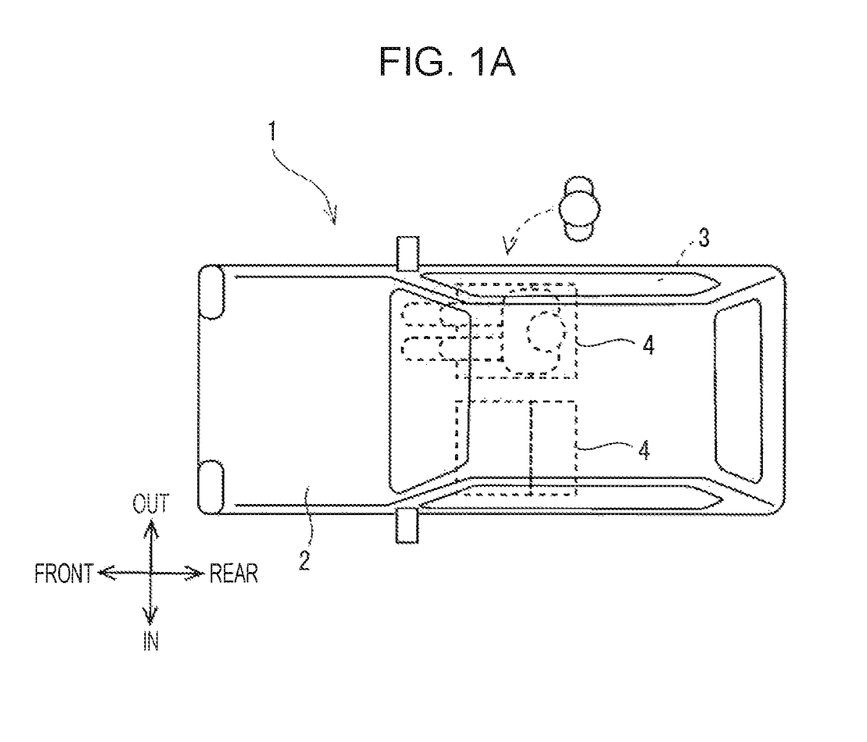
FIG. 1A and FIG. 1B illustrate an automobile in which a seat as a seat device according to an embodiment of the disclosure is employed.
Figure 1B:
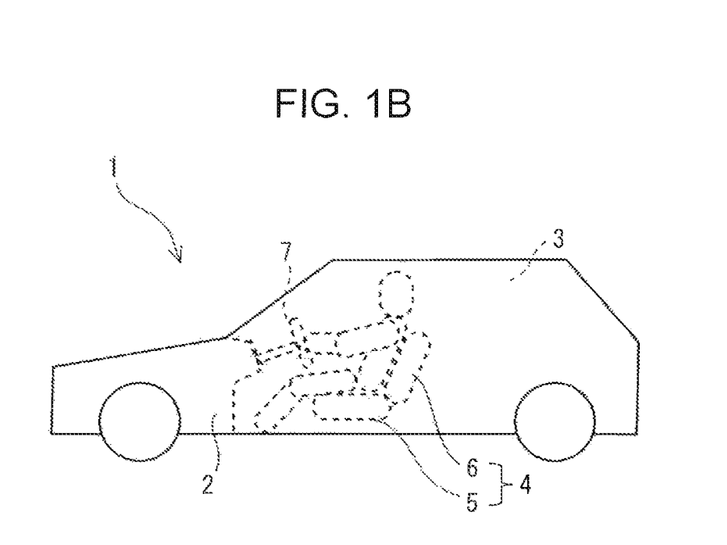

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1A and FIG. 1B illustrate an automobile 1 in which a seat 4 according to an embodiment of the disclosure is employed.

FIG. 1A is a top view. FIG. 1B is a left side view.

The automobile 1 is an example of a vehicle. The automobile 1 may be an automobile that uses an internal combustion engine as a power source of traveling, an automobile that uses stored power of a battery as the power source of travelling, or an automobile including a combination thereof.

The automobile 1 in FIG. 1A and FIG. 1B includes a body 2 and a cabin 3 disposed in a center portion of the body 2 in a front-rear direction. In the cabin 3, a seat 4 as a seat device on which an occupant in the automobile 1 is to be seated is disposed. FIG. 1A and FIG. 1B illustrate, of the seats 4 disposed side by side at the front and the rear, independent seats on the front side. The seat 4 includes a seat cushion 5 on which the buttocks of an occupant are to be placed, and a back cushion 6 that stands at the rear edge of the seat cushion 5.

In front of an occupant that sits on the seat 4, a handle 7 projecting rearward from a dashboard is disposed. An occupant operates traveling and the like of the automobile 1 by operating the handle 7, and foot pedals and a shift lever, which are not illustrated, in a sitting posture on the seat 4.

Figure 2A:
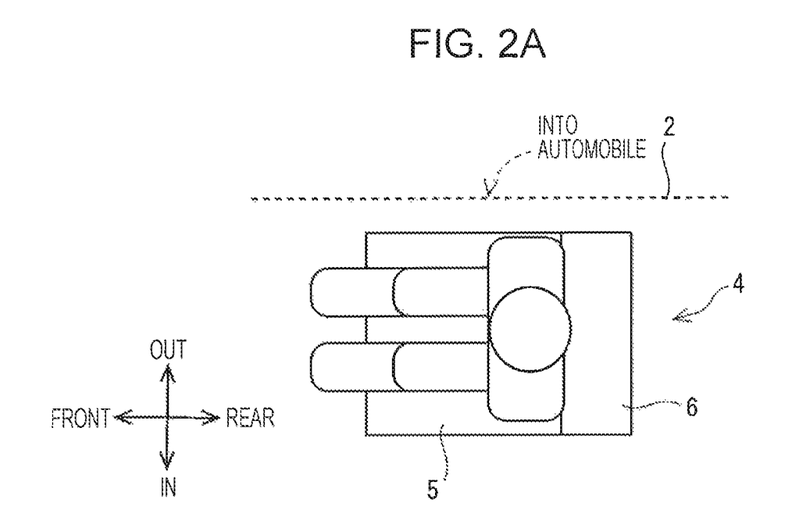
FIG. 2A and FIG. 2B illustrate a sitting state of an occupant on the seat of the automobile in FIG. 1A and FIG. 1B.
Figure 2B:
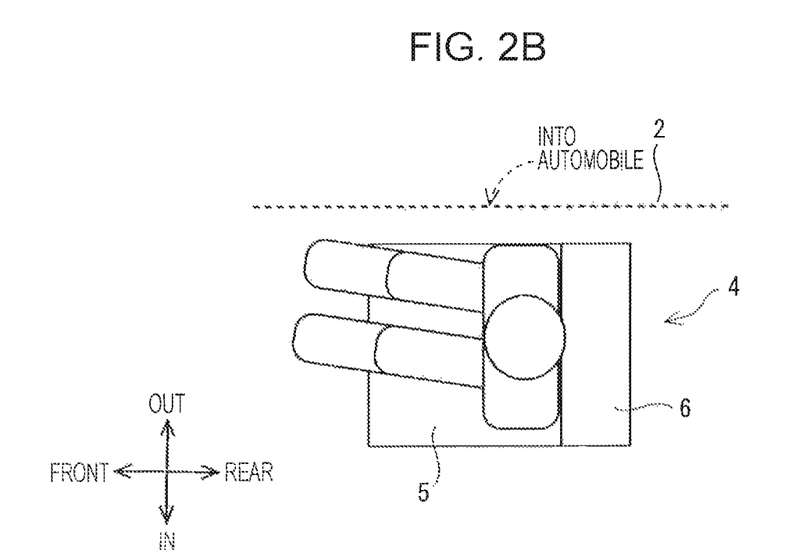

FIG. 2A and FIG. 2B illustrate a sitting state of an occupant on the seat 4 of the automobile 1 in FIG. 1A and FIG. 1B.

FIG. 2A illustrates a state in which an occupant sits on the seat 4 in a correct direction and a correct posture, that is, with the buttocks and the lower limbs aligned in the front-rear direction of the automobile 1. The buttocks of the occupant are placed in a correct seating location at a rear portion of the seat cushion 5 with the back being along the back cushion 6.

As a result of thus sitting in the seating location of the seat 4 in the correct direction and the correct posture, the occupant is suppressed from easily getting tired, even when sitting for a long time.

FIG. 2B illustrates a state in which an occupant sits on the seat 4 in a direction and a posture in which the buttocks and the lower limbs are directed outward in the front-rear direction of the automobile 1. Even in this case, the buttocks of the occupant are placed on the rear portion of the seat cushion 5, and the back can be along the back cushion 6. An occupant opens and closes a door (not illustrated) of the body 2. The door is disposed at the side of the body 2 to be openable and closable. The occupant enters an inner portion of the vehicle through the door and sits on the seat 4. Thus, the occupant tends to sit on the seat 4 with the waist and the lower limbs directed slightly outward in the front-rear direction, as illustrated in FIG. 2B. As it is possible to make the back be along the back cushion 6 by sitting on the rear portion of the seat cushion 5, an occupant tends to drive or ride the automobile 1 in the posture as it is. When being in the automobile, the occupant may not feel great discomfort relating to the twist between the lower limbs and the upper body. There is thus a likelihood of the occupant not correcting the twisted posture and continuing to be in the automobile 1 that travels in the twisted posture. As a result, the occupant may feel great discomfort caused by the twist, for example, after being in the automobile for a long time.

As described above, an occupant does not always sit, in the correct seating location of the seat cushion 5, in a correct direction and a correct posture. An improvement of the seat 4 of the automobile 1 is desirable.

Figure 3A:
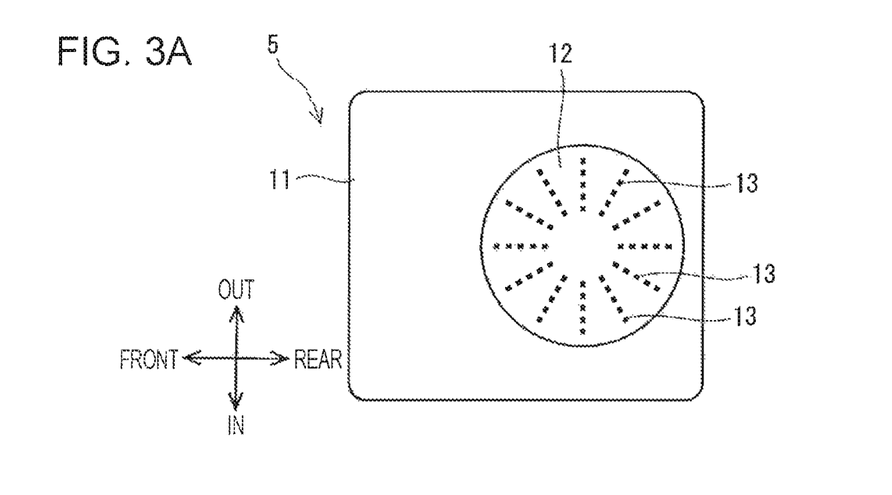
FIG. 3A, FIG. 3B, and FIG. 3C schematically illustrate a structure of a seat cushion of the seat according to an embodiment of the disclosure.
Figure 3B:
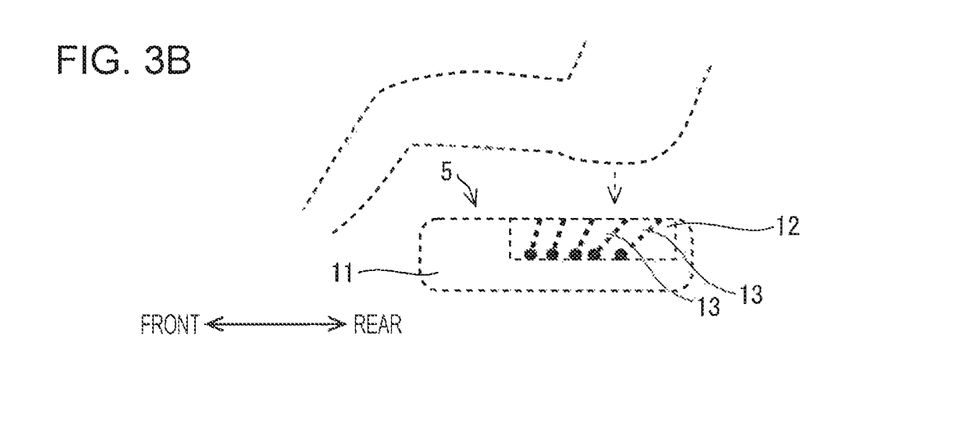
Figure 3C:
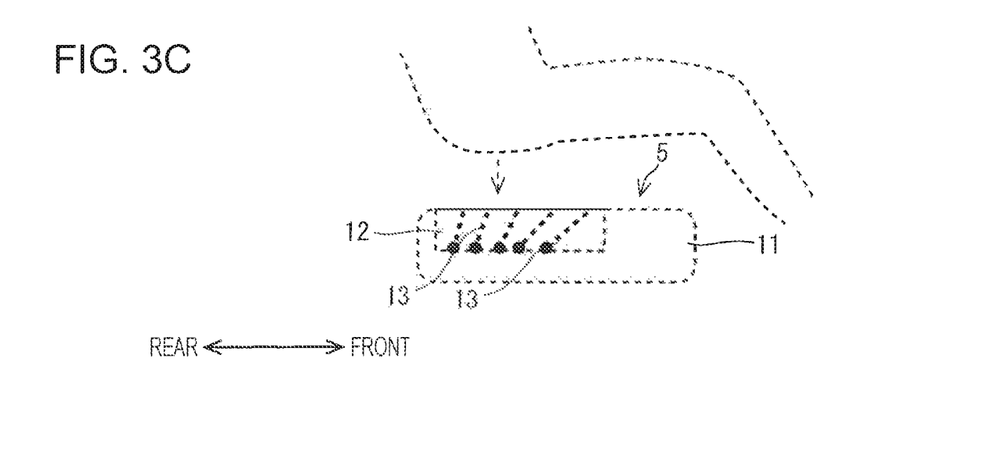

FIG. 3A, FIG. 3B, and FIG. 3C schematically illustrate a structure of the seat cushion 5 of the seat 4 according to an embodiment of the disclosure.

FIG. 3A is a top view of the seat cushion 5. FIG. 3B is a schematic side view of the seat cushion 5 as viewed from the inner side. FIG. 3C is a schematic side view of the seat cushion 5 as viewed from the outer side.

The seat cushion 5 in FIG. 3A, FIG. 3B, and FIG. 3C includes a cushion body 11 that forms the entirety of a seat on which an occupant in the automobile 1 is to be seated, a slow deformation foam 12, and a plurality of tilted standing members 13.

The cushion body 11 forms the entirety of the seat surface of the seat 4. As with a normal seat 4, for example, a spring and a frame material that are made of metal may be disposed at the periphery and a lower portion of the cushion body 11. The cushion body 11 may include an urethane material or the like, which is a material included in the normal seat 4, and may include a material having a characteristic of being easily flexible and soft so as to be easily compression deformed even when, for example, instantaneously receiving a load.

The slow deformation foam 12 is housed in a circular upper surface recess in a rear portion of the cushion body 11. The circular upper surface recess in FIG. 3A, FIG. 3B, and FIG. 3C is disposed in a portion of the cushion body 11 from a rear portion to a center portion. The slow deformation foam 12 may have a disk shape having the same size as that of the circular upper surface recess. The circular slow deformation foam 12 is housed movably in an inner portion of the circular upper surface recess of the cushion body 11. Consequently, the circular slow deformation foam 12 is disposed in an area from a rear portion on which the buttocks of an occupant in a correct seating location in FIG. 2A are to be placed to a portion on the front side of the rear portion. The circular slow deformation foam 12 may be bonded by an adhesive or the like to the circular upper surface recess of the cushion body 11.

The circular slow deformation foam 12 includes a low-resilience material in which compression deformation does not easily proceed compared with the cushion body 11, which is the other portion of the seat cushion 5. The use of the low-resilience material causes the slow deformation foam 12 not to be easily compression deformed by an instantaneous load. The compression deformation of the slow deformation foam 12 proceeds as a result of a load being applied continuously for a certain period of time. The slow deformation foam 12 has a characteristic of being hard, in which compression deformation proceeds belatedly compared with the cushion body 11. Consequently, the load of an occupant sitting on the seat cushion 5 is applied to the slow deformation foam 12 more efficiently than to the cushion body 11.

The tilted standing members 13 are plate-shaped elastic plates. The plate-shaped tilted standing members 13 stand in an inner portion of the circular slow deformation foam 12 so as to extend in the up-down direction, which corresponds to a load direction. The plurality of tilted standing members 13 are arranged side by side in a circular shape in the circumferential direction of the circular slow deformation foam 12. Consequently, around the center of seating (location) of the seat cushion 5, the plurality of tilted standing members 13 are arranged in an arc shape to extend from the outer portion of the circular slow deformation foam 12 toward the inner portion through the front portion. The width of each tilted standing member 13 in the radial direction, which is a direction perpendicular to the circumference or the arc, is larger than the thickness thereof in the arc direction. The plurality of tilted standing members 13 can be tilted independently from each other.

In FIG. 3A, FIG. 38, and FIG. 3C, the tilted standing members 13 are disposed to be slightly tilted, compared with the up-down direction, in a state in which no load is applied thereto. For example, as illustrated in FIG. 3B, the tilted standing members 13 that stand in the inner portion of the circular slow deformation foam 12 are tilted rearward in the state in which no load is applied to the slow deformation foam 12. As illustrated in FIG. 3C, the tilted standing members 13 that stand in the outer portion of the slow deformation foam 12 are tilted forward in the state in which no load is applied to the slow deformation foam 12. The inclination angles of these plurality of tilted standing members 13 may be uniform. When the slow deformation foam 12 is compression deformed by a load, the tilted standing members 13, which are tilted in an initial state thereof, tend to be tilted such that the tilting thereof increases. The tilted standing members 13 tend to be tilted such that the tilting thereof in the initial state increases, even when a load is not applied uniformly to the slow deformation foam 12.

The tilted standing members 13 may include a material that is deformable so as to be relatively easily curved when a compressing force is applied thereto such that the plates are curved. Consequently, the tilted standing members 13 are suppressed from easily coming into contact with a sitting occupant strongly compared with the slow deformation foam 12. The tilted standing members 13 are suppressed from easily giving discomfort to the sitting occupant.

Figure 4A:
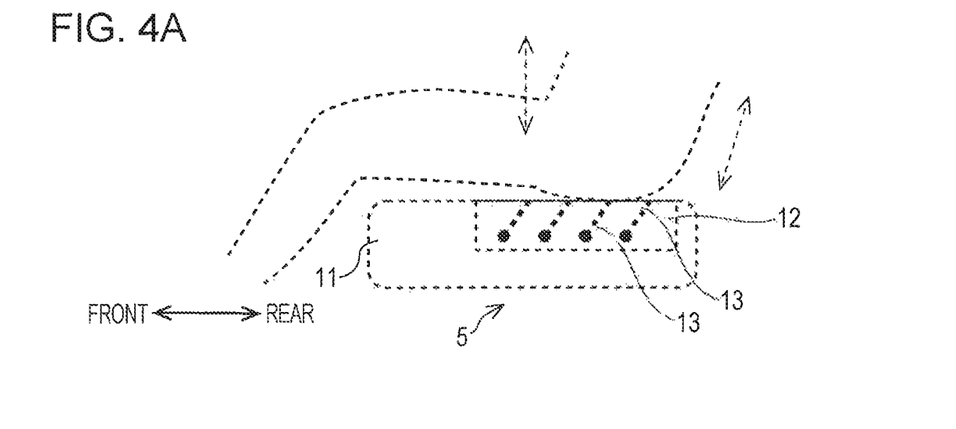
FIG. 4A, FIG. 4B, and FIG. 4C schematically illustrate a sitting state of an occupant with respect to the seat cushion in FIG. 3A, FIG. 3B, and FIG. 3C.
Figure 4B:
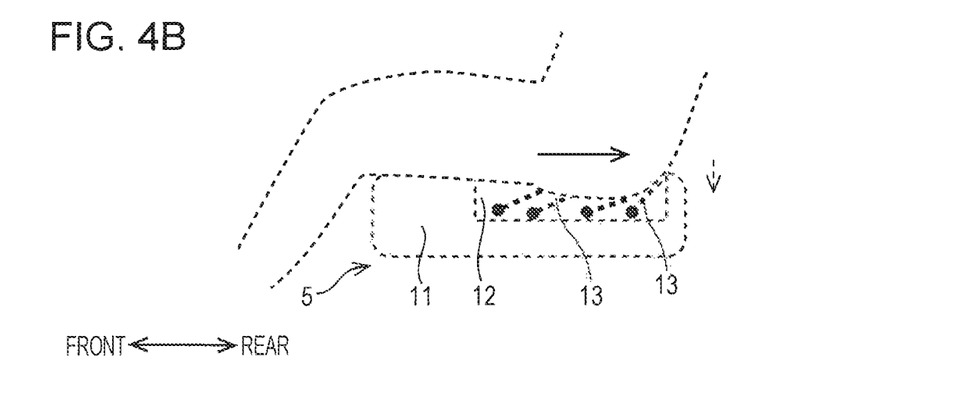
Figure 4C:
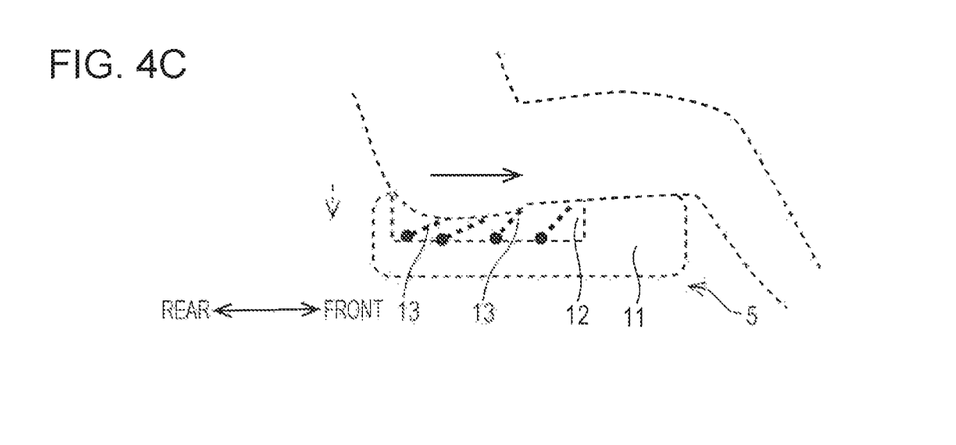

FIG. 4A, FIG. 4B, and FIG. 4C schematically illustrate a sitting state of an occupant with respect to the seat cushion 5 in FIG. 3A, FIG. 3B, and FIG. 3C.

FIG. 4A illustrates a sitting state at a time when the occupant starts sitting on the seat cushion 5. An occupant sits on the seat cushion 5 such that the buttocks are placed on the circular slow deformation foam 12. Consequently, the load of the sitting occupant is applied to be concentrated on the circular slow deformation foam 12 through the buttocks. As a result of the occupant continuously sitting thereon, the circular slow deformation foam 12 starts compression deformation.

FIG. 4B and FIG. 4C illustrate a state in which an occupant continuously sits on the seat cushion 5. FIG. 4B illustrates the seat cushion 5 as viewed from the inner side. FIG. 4C illustrates the seat cushion 5 as viewed from the outer side. Due to the continuous sitting of the occupant, the circular slow deformation foam 12 is compression deformed. In the inner portion of the compression-deformed slow deformation foam 12, the tilted standing members 13 are largely tilted rearward by following the deformation. Each of the tilted standing members 13 is tilted, in response to a loaded applied thereto, by a degree larger than the tilting at a time before the load is applied. For example, when the outer portion of the circular slow deformation foam 12 is deformed by a load, the tilted standing members 13 that stand in the outer portion of the slow deformation foam 12 are tilted forward, as illustrated in FIG. 4C, from respective positions thereof at a time before the load is applied. When the inner portion of the circular slow deformation foam 12 is deformed by a load, the tilted standing members 13 that stand in the inner portion of the slow deformation foam 12 are tilted rearward, as illustrated in FIG. 4B, from respective positions thereof at a time before the load is applied. As described above, when the outer portion of the slow deformation foam 12 is deformed by a load, each tilted standing member 13 is tilted along the arc from the respective positions at a time before the load is applied such that the tilting thereof increases.

Then, the largely tilted plurality of tilted standing members 13 become like a substantially flat surface on the lower side of the buttocks of the occupant sitting in the correct seating location. Consequently, the buttocks of the continuously sitting occupant are suppressed from further sinking downward, and the sitting state may become stable.

Moreover, as a result of the plurality of tilted standing members 13 being tilted along the arc such that respective tilting increases, the direction of the buttocks of the occupant continuously sitting on the seat cushion 5 is corrected. For example, as illustrated in FIG. 4C, a portion that is placed on the outer portion of the slow deformation foam 12 is pushed forward from the position thereof at a time when sitting is started. In contrast, as illustrated in FIG. 4B, a portion that is placed on the inner portion of the slow deformation foam 12 is pushed rearward from the position thereof at the time when sitting is started. As a result, the direction of the buttocks of the occupant continuously sitting on the seat cushion 5 becomes inward compared with the direction thereof at the time when sitting is started. As a result of the direction of the buttocks of the occupant being turned inward, the lower limbs of the occupant are also turned inward.

Figure 5A:
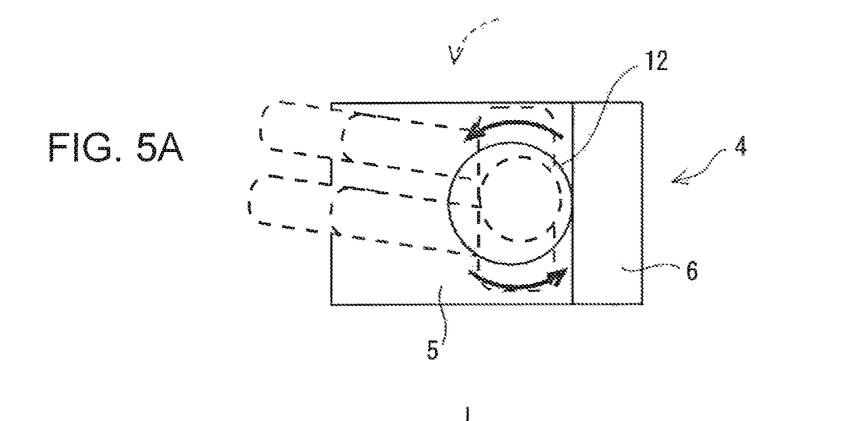
FIG. 5A and FIG. 5B illustrate a change in the sitting state of the occupant on the seat cushion in FIG. 3A, FIG. 3B, and FIG. 3C.
Figure 5B:
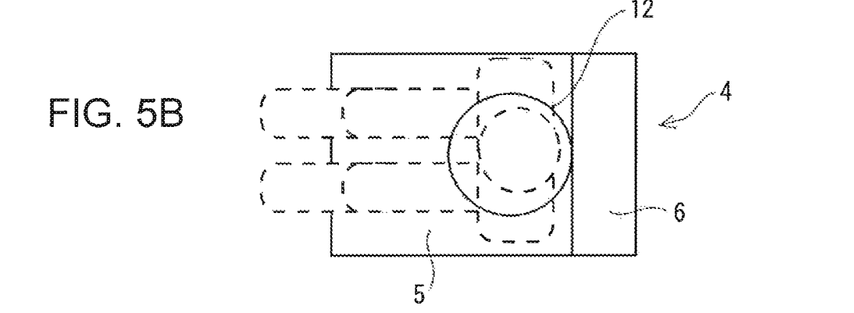

FIG. 5A and FIG. 5B illustrate a change in the sitting state of the occupant on the seat cushion 5 in FIG. 3A, FIG. 3B, and FIG. 3C.

FIG. 5A illustrates a sitting state at a time when the occupant starts sitting on the seat cushion 5.

FIG. 5B illustrates a sitting state after continuous sitting of the occupant on the seat cushion 5.

In the case of FIG. 5A, the buttocks of the occupant in the automobile 1 are directed slightly outward in the front-rear direction. When the occupant continues sitting in such a state, an inwardly turning force is applied to the buttocks of the occupant by the circular slow deformation foam 12 and the plurality of tilted standing members 13 arranged in the inner portion of the slow deformation foam 12 along the circumference. As a result, the buttocks of the occupant are turned inward and, as illustrated in FIG. 5B, corrected to be directed in the front-rear direction. The lower limbs of the occupant are also extended toward the front from the forwardly directed buttocks.

As described above, in the present embodiment, the slow deformation foam 12 in which compress deformation proceeds as a result of a load being continuously applied thereto is disposed in at least a portion of the seat cushion 5 on which the buttocks of an occupant are to be placed. In addition, in the inner portion of the slow deformation foam 12, the plurality of tilted standing members 13 configured to be tilted as a result of the slow deformation foam 12 being deformed by a load stand in the load direction. The slow deformation foam 12 includes a low-resilience material. Therefore, as a result of the load of an occupant sitting on the seat cushion 5 being applied continuously to the slow deformation foam 12, the slow deformation foam 12 is compression deformed. In the compression deformed slow deformation foam 12, the plurality of tilted standing members 13 that stand in the load direction are tilted. Consequently, the waist and the lower limbs of the occupant can be stable in a state in which the load is applied to the slow deformation foam 12.

Moreover, in the present embodiment, the plurality of tilted standing members 13 that stand in the slow deformation foam 12 are arranged in a circumferential shape around the center of the circular slow deformation foam 12. When the outer portion of the slow deformation foam 12 is deformed by a load, each tilted standing member 13 is tilted, from respective positions thereof at a time before the load is applied, along the circumference such that tilting thereof increases. Consequently, among the plurality of tilted standing members 13 that stand in the slow deformation foam 12, those that stand in the outer portion of the slow deformation foam 12 are tilted forward when the outer portion of the slow deformation foam 12 is deformed by a load, and those that stand in the inner portion of the slow deformation foam 12 are tilted rearward, conversely. As a result, the direction of the waist and the lower limbs of the occupant whose load is applied to the slow deformation foam 12 is changed to be inward with a portion placed on the inner portion of the slow deformation foam 12 being moved rearward and a portion placed on the outer portion of the slow deformation foam 12 being moved forward. The direction of the waist and the lower limbs of the occupant that gets into the automobile by opening a door of the cabin 3 and sits on the seat 4 can be corrected to be inward after sitting. The twist between the lower limbs and the upper body of the occupant decreases, and the occupant is suppressed from easily feeling discomfort caused by the twist thereof, for example, even after being in the automobile for a long time. The sitting state of the occupant in the automobile 1 is improved, and the occupant can sit in the correct seating location of the seat cushion 5 in the correct direction and the correct posture and is suppressed from easily getting tired, even when sitting for a long time.

In the present embodiment, the tilted standing members 13 that stand in the outer portion of the slow deformation foam 12 are tilted forward in a state in which no load is applied to the slow deformation foam 12. The tilted standing members 13 that stand in the inner portion of the slow deformation foam 12 are tilted rearward in the state in which no load is applied to the slow deformation foam 12. The tilted standing members 13 tilted forward in the outer portion of the slow deformation foam 12 are originally tilted forward, even in a state in which no load is applied to the slow deformation foam 12. The tilted standing members 13 tilted rearward in the inner portion of the slow deformation foam 12 are originally tilted rearward, even in the state in which no load is applied to the slow deformation foam 12. Consequently, even at the moment when an occupant sits, the plurality of tilted standing members 13 can function to change the direction of the waist and the lower limbs of the occupant to be inward. The direction of the waist and the lower limbs of an occupant that gets into the automobile by opening the door of the cabin 3 and intends to sit on the seat 4 can be corrected to be constantly inward also during the sitting. The twist between the lower limbs and the upper body of the occupant decreases, and the occupant is suppressed from easily feeling discomfort caused by the twist thereof, for example, even after being in the automobile for a long time. The sitting state of the occupant in the automobile 1 is improved, and the occupant can sit in the correct seating location of the seat cushion 5 in the correct direction and the correct posture and is suppressed from easily getting tired, even when sitting for a long time.

In the present embodiment, each of the tilted standing members 13 has a plate shape whose width in a direction perpendicular to the arc is larger than the thickness thereof in the arc direction. Consequently, the tilted standing members 13 can be tilted in a direction restricted by the plate shape. The tilted standing members 13 can be tilted in a desired direction restricted by the plate shape, even when a uniform load is not applied to the entirety thereof.

In the present embodiment, the slow deformation foam 12 has the disk shape and is movably housed in the circular recess in the seat cushion 5 without being bonded thereto. Consequently, the entirety of the disk-shaped slow deformation foam 12 turns round in response to the movement of tilting of the plurality of tilted standing members 13. As a result, it is possible to obtain, for the waist and the lower limbs of an occupant, a function of changing the direction thereof to be inward by the rotation of the entirety of the disk-shaped slow deformation foam 12. Ability of inwardly changing the direction of the waist and the lower limbs of an occupant can be increased.

The above embodiment is an example of embodiments of the present disclosure. The present disclosure is, however, not limited thereto and can be variously modified or changed within the range not deviating from the gist of the disclosure.

For example, in the above-described embodiment, the slow deformation foam 12 is circular because of the disk shape.

Alternatively, for example, the slow deformation foam 12 may have a shape other than a circular shape, for example, a quadrangular shape and the like. In this case, regardless of the outer shape of the slow deformation foam 12, the plurality of tilted standing members 13 may be arranged in a circumferential shape or may be arranged in an arc shape that is a portion of a circumference. The plurality of tilted standing members 13 are simply arranged to be capable of inwardly directing the buttocks.

In the above-described embodiment, the plurality of tilted standing members 13 are disposed side by side in the arc shape in the circumferential direction in the circular slow deformation foam 12.

Alternatively, for example, the plurality of tilted standing members 13 may be simply, regardless of the shape of the slow deformation foam 12, disposed side by side so as to be divided in two rows on the inner side and the outer side of the center of the seat cushion 5 in the vehicle width direction. Even in this case, when the outer portion of the slow deformation foam 12 is deformed by a load, the tilted standing members 13 that stand in the outer portion of the slow deformation foam 12 are tilted forward from the respective positions thereof at a time before the load is applied. When the inner portion of the slow deformation foam 12 is deformed by a load, the tilted standing members 13 that stand in the inner portion of the slow deformation foam 12 are tilted rearward from the respective positions thereof at a time before the load is applied. Consequently, as with those in the above-described embodiment, the plurality of tilted standing members 13 can function to inwardly turn the direction of the waist and the lower limbs of a sitting occupant.

In the above-described embodiment, each of the tilted standing members 13 has a flat plate shape.

Alternatively, for example, each of the tilted standing members 13 may have a shape obtained by curving or bending a flat plate. The slow deformation foam 12 may be constituted by a plurality of slow deformation foams 12 that overlap each other in the load direction. In this case, the tilted standing members 13 may be curved or bent at the boundary portion thereof by following the overlapping structure of the slow deformation foams 12.

The invention claimed is:

1. A seat device for a vehicle, the seat device comprising:
   a seat cushion on which an occupant in the vehicle is to be seated;
   a slow deformation portion that is disposed in at least a portion of the seat cushion and that is configured in such a manner that deformation thereof proceeds as a result of a load to be applied continuously to the slow deformation portion; and
   a plurality of tilted standing members that stand in a load direction within the slow deformation portion and that are configured to be tilted as a result of the deformation of the slow deformation portion by the load,
   wherein, when an outer portion of the slow deformation portion is deformed by the load, the tilted standing members that stand in the outer portion of the slow deformation portion are tilted forward from respective positions thereof at a time before the load is applied, and
   wherein, when an inner portion of the slow deformation portion is deformed by the load, the tilted standing members that stand in the inner portion of the slow deformation portion are tilted rearward from respective positions thereof at a time before the load is applied.

2. The seat device for a vehicle according to claim 1,
   wherein the tilted standing members are arranged in a circumferential shape around a center of the slow deformation portion, and
   wherein, when the outer portion of the slow deformation portion is deformed by the load, the tilted standing members that stand in the outer portion of the slow deformation portion are tilted along a circumference from respective positions at a time before the load is applied.

3. The seat device for a vehicle according to claim 2,
   wherein the tilted standing members that stand in the outer portion of the slow deformation portion are disposed so as to be tilted forward in a state in which no load is applied to the slow deformation portion, and wherein the tilted standing members that stand in the inner portion of the slow deformation portion are disposed so as to be tilted rearward in the state in which no load is applied to the slow deformation portion.

4. The seat device for a vehicle according to claim 3, wherein each of the tilted standing members has a plate shape.

5. The seat device for a vehicle according to claim 3, wherein the slow deformation portion comprises a low-resilience material.

6. The seat device for a vehicle according to claim 3, wherein the slow deformation portion has a disk shape and is housed in a circular recess in the seat cushion.

7. The seat device for a vehicle according to claim 2, wherein each of the tilted standing members has a plate shape.

8. The seat device for a vehicle according to claim 2, wherein the slow deformation portion comprises a low-resilience material.

9. The seat device for a vehicle according to claim 2, wherein the slow deformation portion has a disk shape and is housed in a circular recess in the seat cushion.

10. The seat device for a vehicle according to claim 1, wherein the tilted standing members that stand in the outer portion of the slow deformation portion are disposed so as to be tilted forward in a state in which no load is applied to the slow deformation portion, and wherein the tilted standing members that stand in the inner portion of the slow deformation portion are disposed so as to be tilted rearward in the state in which no load is applied to the slow deformation portion.

11. The seat device for a vehicle according to claim 10, wherein each of the tilted standing members has a plate shape.

12. The seat device for a vehicle according to claim 10, wherein the slow deformation portion comprises a low-resilience material.

13. The seat device for a vehicle according to claim 10, wherein the slow deformation portion has a disk shape and is housed in a circular recess in the seat cushion.

14. The seat device for a vehicle according to claim 1, wherein each of the tilted standing members has a plate shape.

15. The seat device for a vehicle according to claim 1, wherein the slow deformation portion comprises a low-resilience material.

16. The seat device for a vehicle according to claim 1, wherein the slow deformation portion has a disk shape and is housed in a circular recess in the seat cushion.

17. A seat device for a vehicle, the seat device comprising:

a seat cushion on which an occupant in the vehicle is to be seated;

a slow deformation portion that is disposed in at least a portion of the seat cushion and that is configured in such a manner that deformation thereof proceeds as a result of a load applied to the slow deformation portion; and a plurality of tilted standing members, and wherein a first set of the plurality of tilted standing members stand in a load direction in an inner portion of the slow deformation portion and are configured to be tilted as a result of the deformation of the slow deformation portion by the load, wherein a second set of the plurality of tilted standing members stand in a load direction in an outer portion of the slow deformation portion and are configured to be tilted as a result of the deformation of the slow deformation portion by the load, wherein, when the inner portion of the slow deformation portion is deformed by the load, the first set of the plurality of the tilted standing members are tilted rearward from respective positions thereof at a time before the load is applied, and wherein, when an outer portion of the slow deformation portion is deformed by the load, the second set of the plurality of tilted standing members are tilted forward from respective positions thereof at a time before the load is applied.

18. The seat device for a vehicle according to claim 17, wherein the slow deformation portion has a disk shape and is housed in a circular recess provided in an upper surface of the seat cushion.

19. The seat device for a vehicle according to claim 18, wherein the disk shape is movably housed in the circular recess.

20. The seat device for a vehicle according to claim 17 wherein the slow deformation portion comprises a low-resilience foam material and the tilted standing members are plate members embedded in the low-resilience foam material.

* * * * *